United States Patent [19]
Wennerberg

[11] 3,828,248

[45] Aug. 6, 1974

[54] APPARATUS FOR MEASURING A PREDETERMINED CHARACTERISTIC OF MOVING SHEET MATERIAL WHICH ACCOMMODATES BOTH TILTING AND CHANGES IN THICKNESS AND VERTICAL LOCATION OF THE MATERIAL

[76] Inventor: Gunnar Wennerberg, 1641 Poppy Way, San Jose, Calif. 95129

[22] Filed: Apr. 21, 1972

[21] Appl. No.: 246,188

Related U.S. Application Data
[63] Continuation-in-part of Ser. No. 105,350, Jan. 14, 1971, abandoned.

[52] U.S. Cl. ............... 324/34 TK, 73/159, 162/198, 162/263, 340/259, 162/198;263
[51] Int. Cl. ........................................... G01r 33/00
[58] Field of Search ......... 324/34 TK, 37, 40, 61 R; 33/143 L, 147 L, 147 N, 174 L; 73/159; 340/259; 209/82

[56] References Cited
UNITED STATES PATENTS
2,581,394   1/1952   Dinger ........................... 324/34 TK
3,411,075   11/1968   Kahoun ......................... 324/34 TK

FOREIGN PATENTS OR APPLICATIONS
1,016,028   9/1957   Germany ............................. 209/82
157,503   1963   U.S.S.R. ............................... 324/40
1,001,081   8/1965   Great Britain .................. 324/34 TK
619,826   4/1927   France ............................. 324/61 N

*Primary Examiner*—Robert J. Corcoran
*Attorney, Agent, or Firm*—Flehr, Hohbach, Test, Albritton & Herbert

[57] ABSTRACT

Apparatus for sensing the thickness of sheet materials such as paper is in the form of a gauge having opposed rubber diaphrams which are actuated into mutual engagement with the moving sheet material by associated air pumps. Mounted on the diaphragms are magnetic circuit means which include a ferrite core and an inductive coil whose inductance is affected by the gap caused by the paper which is part of the magnetic flux path. The coil of the ferrite core is coupled to an oscillator whereby the resonant frequency of the oscillator indicates the gap distance and thus, the thickness of the sheet material.

18 Claims, 8 Drawing Figures

PATENTED AUG 6 1974
3,828,248
SHEET 1 OF 4
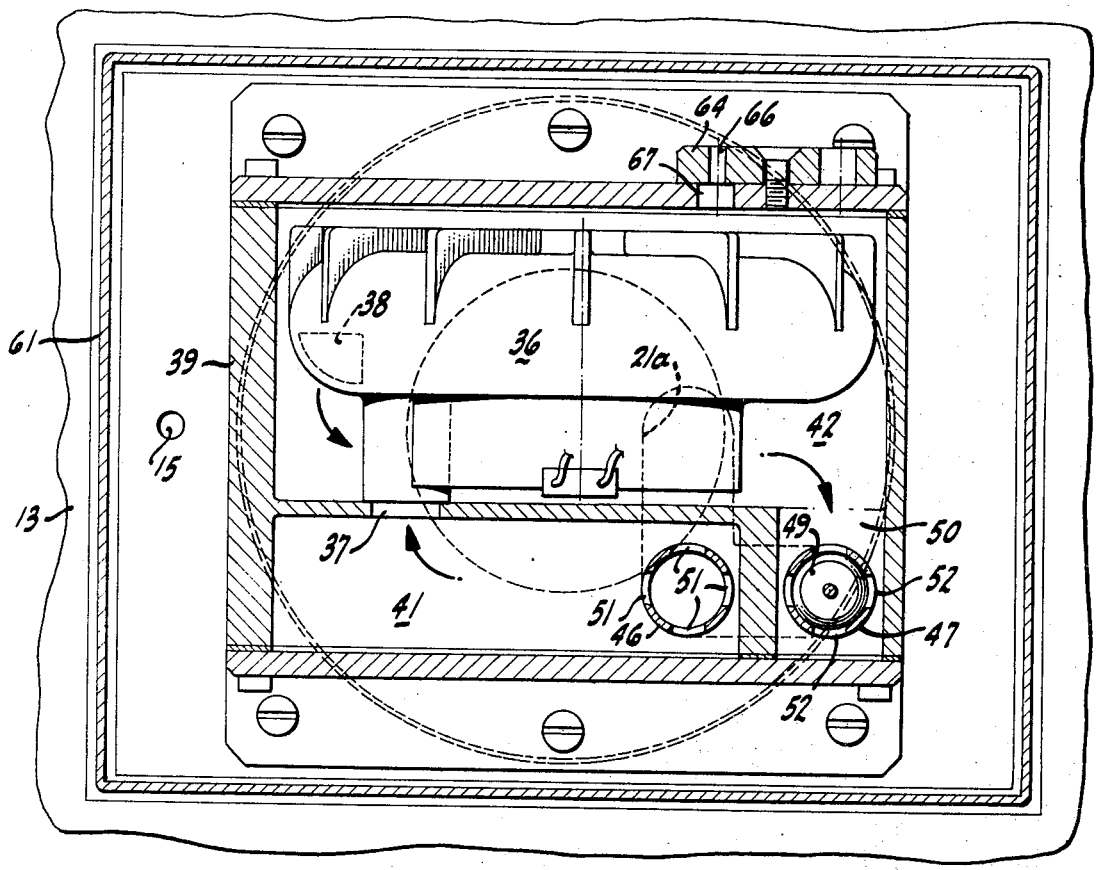
FIG_3
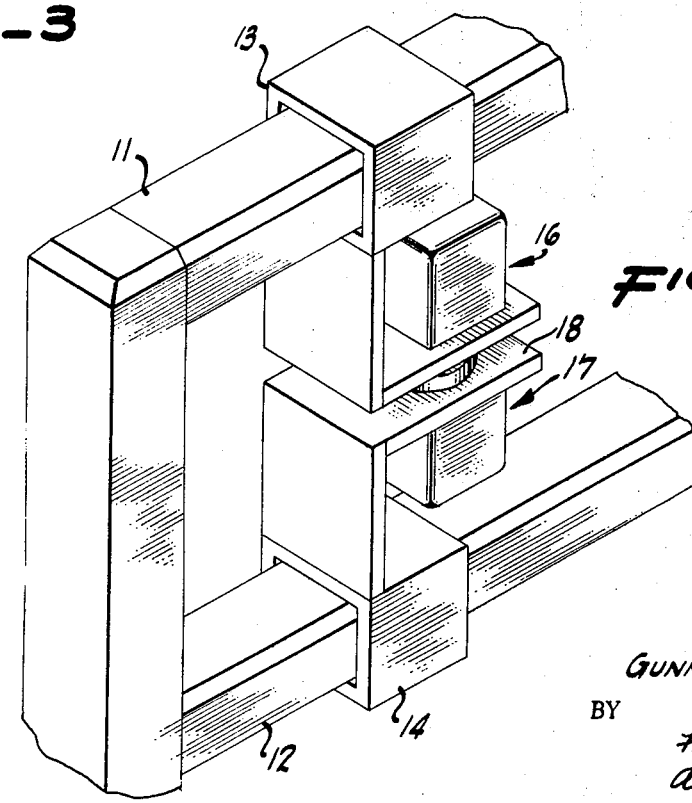
FIG_1
INVENTOR.
GUNNAR WENNERBERG
BY
Flehr, Hohbach, Test,
Albritton & Herbert
ATTORNEYS

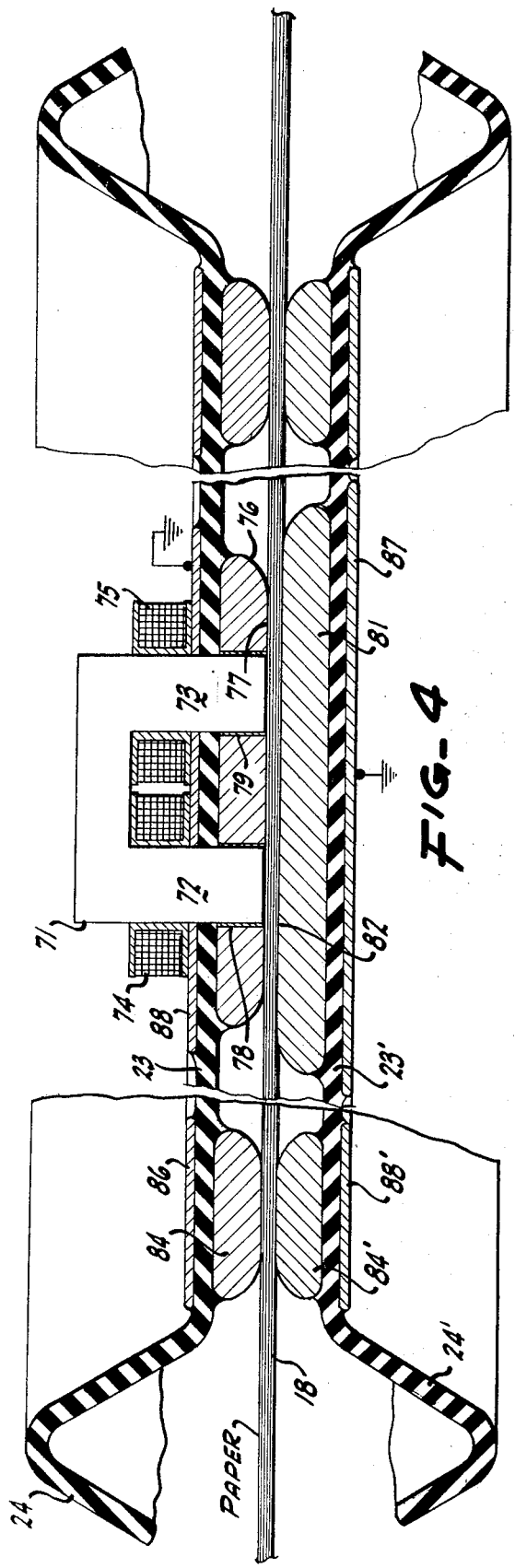
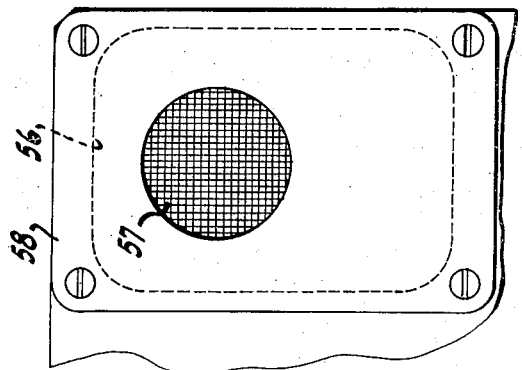
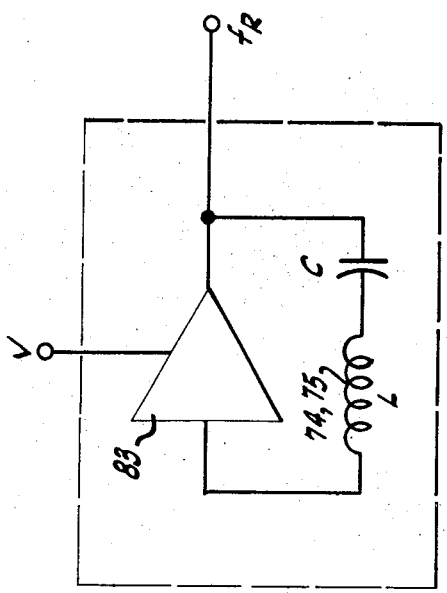
FIG. 4
FIG. 2A
FIG. 5
INVENTOR.
GUNNAR WENNERBERG

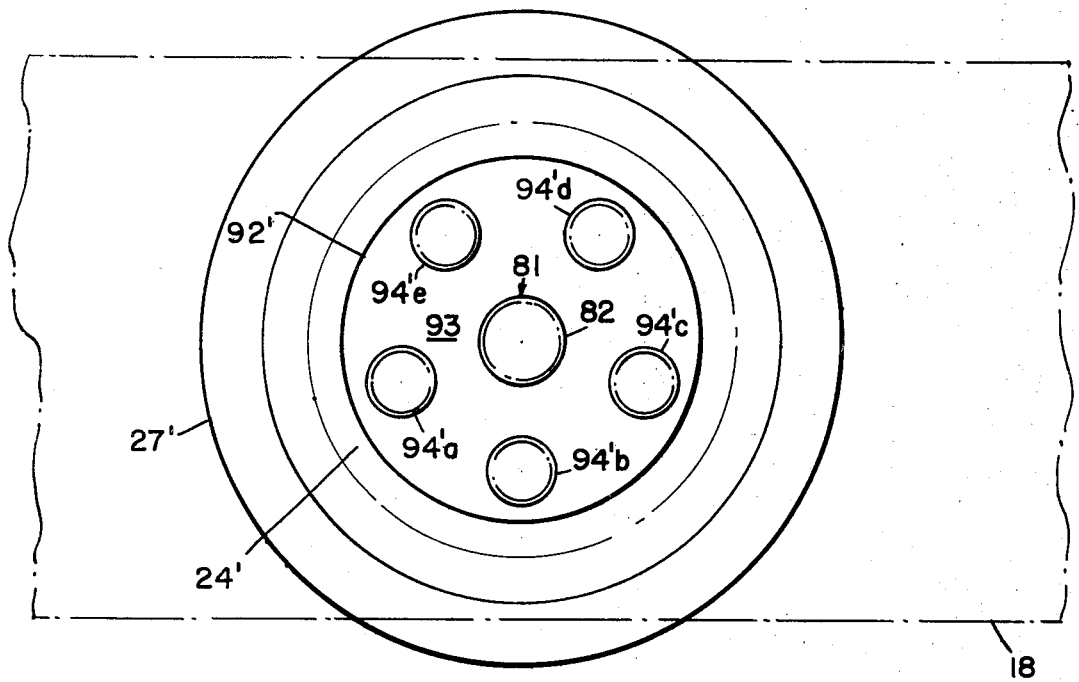
FIG_7
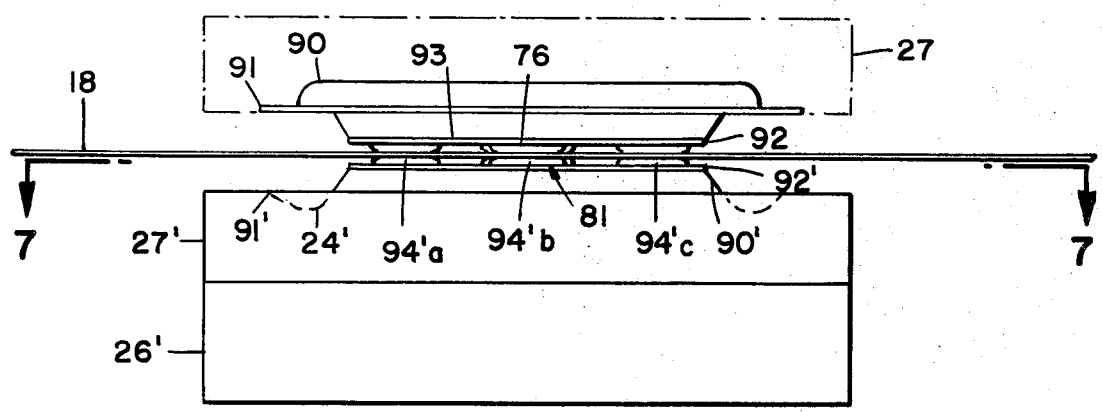
FIG_6

APPARATUS FOR MEASURING A PREDETERMINED CHARACTERISTIC OF MOVING SHEET MATERIAL WHICH ACCOMMODATES BOTH TILTING AND CHANGES IN THICKNESS AND VERTICAL LOCATION OF THE MATERIAL

CROSS-REFERENCE TO RELATED APPLICATION

This application is a continuation-in-part of copending application Ser. No. 106,350 filed Jan. 14, 1971, in the name of Gunnar Wennerberg and now abandoned.

BACKGROUND OF THE INVENTION

The present invention is directed to apparatus for measuring a predetermined characteristic and more particularly for sensing the thickness of sheet material. One of the more common names of such apparatus is a caliper gauge. The present invention is more specifically directed towards the measurement of the thickness of a sheet material which is in the process of being manufactured and, therefore, is moving linearly at a high rate of speed.

In measuring the thickness of sheet material such as paper, caliper gauges, in the past have attempted to accommodate the fluttering and shifting of the paper and also the extreme ambient temperature conditions which are present in the paper making process. Such gauges have used for sensing the thickness of the papers, optical and sonic means or measurement of electrical or magnetic characteristics.

In the measurement process may prior gauges required components of the gauge to ride or bear against the sheet material. To provide for proper articulation, to accommodate the proper tilting and slanting of the paper and yet to minimize the friction drag or force on the paper, various mechanical linkage mechanisms were attempted as well as air bearing devices. None of these devices were totally successful since they were either excessively sensitive to ambient temperature or would not completely follow the tilting and slanting of the paper.

Another difficulty in the measurement of paper thickness on an on-line basis is that the standard for the thickness of paper, as prescribed by the Technical Association of the Pulp and Paper Industry (TAPPI) set out in Standards Bulletin T4110S-44, provides that the paper is to be measured under a pressure of eight pounds per square inch. It has been difficult in the past to normalize the measurements made by on-line devices to correspond exactly with the TAPPI standards.

OBJECTS AND SUMMARY OF THE INVENTION

It is, therefore, a general object of the present invention to provide an improved apparatus for sensing a characteristic of sheet material such as thickness.

It is another object of the invention to provide apparatus as above which is temperature stable and has improved articulation for following the movement of sheet material.

In accordance with the above objects there is provided apparatus for measuring a predetermined characteristic of sheet material. First and second air chambers have first and second major apertures. First and second flexible sheet means each have at least one corrugation and close the first and second apertures respectively. The sheet means are juxtaposed to provide a gap therebetween in which the sheet material may be inserted. Measuring means are mounted on the first and second sheet means for measuring a predetermined characteristic of the sheet material. Air supply means provide a pressure in the chambers greater than ambient pressure to cause the first and second sheet means to move toward one another and to cause the measuring means to move into mutual engagement with the sheet material.

BRIEF DESCRIPTION OF THE DRAWINGS

FIG. 1 is a partial perspective view of a portion of apparatus for sensing the thickness of sheet material embodying the present invention;

FIG. 2A is an elevation view of a cover plate for FIG. 2;

FIG. 3 is a cross-sectional view taken substantially along the line 3—3 of FIG. 2;

FIG. 4 is an enlarged cross-sectional view of a portion of FIG. 1;

FIG. 5 is a circuit schematic of a portion of the invention;

FIG. 6 is a fragmentary elevational view of an alternative embodiment of the invention; and FIG. 7 is a cross-sectional view taken substantially along the line 7—7 of FIG. 6.

BRIEF DESCRIPTION OF THE PREFERRED EMBODIMENTS

Figure 2:
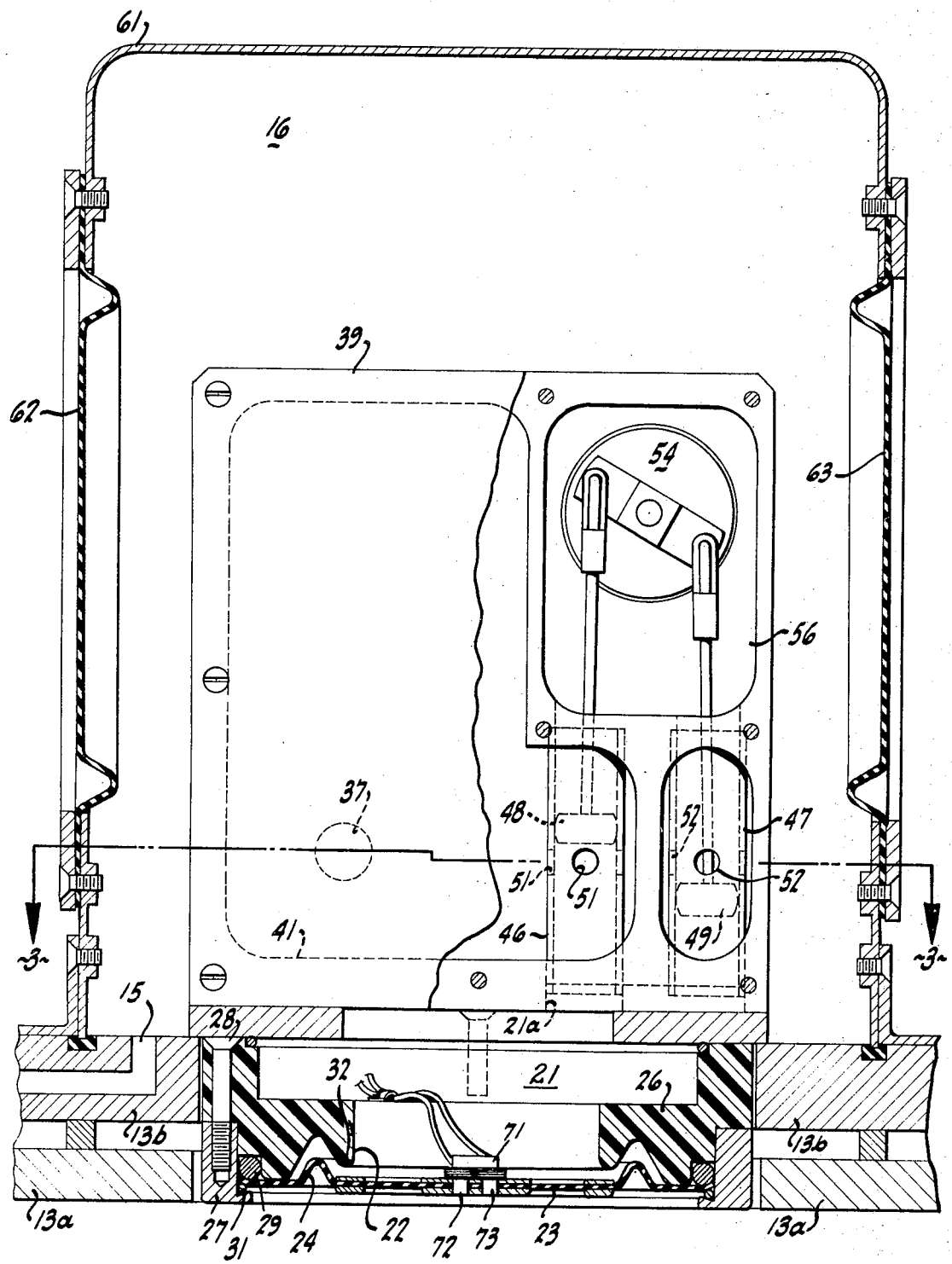
FIG. 2 is an enlarged cross-sectional view of a portion of FIG. 1.

Referring to FIG. 1, the thickness or caliper gauge of the present invention is used in conjunction with a scanner which traverses or scans across the longitudinally moving paper being produced by a paper making machine. The scanner illustrated in FIG. 1 may be of the type described in a copending application, Ser. No. 792,007, filed Jan. 17, 1969 entitled "Sheet Gauging Apparatus" in the name of Mathew G. Boissevain and now U.S. Pat. No. 3,621,259. It consists generally of a framework having a pair of spaced upper and lower beams 11, 12 on which ride the carriages 13 and 14. Carriage 13 carries the upper portion 16 of the gauge of the present invention and carriage 14 a lower portion 17 of the gauge of the present invention. The two portions 16 and 17 are juxtaposed to provide a gap indicated at 18 through which the sheet material whose thickness is to be measured freely moves.

Although the apparatus shown in FIG. 1 merely shows the gauging portions 16 and 17 used to measure paper thickness carriages 13 and 14 would also normally carry additional apparatus for measuring the basis weight moisture content and other characteristics of the sheet material. In addition the gauge of the present invention can itself be modified to measure other characteristics.

In FIG. 2 the upper portion 16 of the thickness gauge of the present invention is shown in cross section. The gauge includes a chamber 21 with major aperture 22 which is closed by flexible sheet means 23. More specifically, the flexible sheet means 23 (which will be explained in detail in connection with FIG. 4) is a rubber diaphram used, for example, for pump purposes. Such a diaphram has at least one annular corrugation or convolution 24 which provides for easy movement of the central portion of the diaphram when actuated either by a piston or as in the case of the present invention by air pressure and vacuum. Other configurations can be used also such as a diaphram with a horseshoe shaped corrugation.

More specifically, portion 16 of the gauge is retained on carriage 13 by a circular plastic inset ring 26 which contains a portion of chamber 21. Carriage 13 is divided into plates 13a and 13b to provide for greater dimensional stability with variation of temperature. This is also the reason for the use of plastic in ring 26. Diaphram 23 is retained against the ring, which also provides part of the major aperture 22, by a retaining ring 27 held by a retaining machine screw 28 (only one of which is shown) to retain the edge of the diaphram 23 between retaining hoops 29 and 31. Ring 26 also includes a V-shaped shoulder portion 32 which is placed opposite the corrugation or convolution 24 for limiting the inward motion of diaphram 23.

In accordance with the invention, air supply means produce an air pressure in chamber 21 and a corresponding chamber in the lower portion 17 (FIG. 1) of the gauge greater than ambient air pressure to cause the flexible sheet 23 and the corresponding sheet in the lower gauge portion 17 to move towards one another and into mutual engagement with the moving sheet material. Also, a vacuum is provided in chamber 21 and the corresponding chamber in the lower gauge portion 17 to provide for rapid retraction of the diaphram. Details of the air supply means are shown in both FIGS. 2 and 3. Pressure or vacuum is provided by a motor driven fan 36 (FIG. 3) having an air inlet 37 and an air outlet 38. Fan 36 is contained in a housing 39 which is coupled to the carriage 13 and to the ring 26 which contains the aperture 22 and a portion of the chamber 21. An upper portion 21a of this chamber is shown by dashed lines.

Fan 36 preferrably is of the vortex type and provides a pressure of from two to three inches of water (0.1 psi). One type of fan that may be used is manufactured by Rotron Incorporated of Woodstock, New York bearing model No. SE2A-1. Fan 36 is mounted in housing 39 and has its air intake 37 coupled to a vacuum cavity 41 and located in the front portion of housing 39 and a pressure cavity 42 located in the rear portion.

These two cavities communicate with the air chamber 21 by means of a piston arrangement which includes a pair of cylinders 46 and 47 with their respective pistons 48 and 49. The lower ends of cylinders 46 and 47 are, as illustrated in FIG. 3, in direct communication with upper portion 21a of the air chamber. Midway at each of the cylinders are multiple apertures 51 and 52 respectively for each cylinder. Apertures 51 directly communicate with the vacuum cavity 41. Apertures 52 communicate with the pressure cavity 42 through an opening 50. Pistons 48 and 49 are reciprocated by a rotary solenoid 54 so that the openings 51 and 52 are alternately coupled to air chamber 21. This, therefore, provides for either pressure or a vacuum in chamber 21 as desired. The upper portions of pistons 46 and 47 are coupled into the cavity 56 which also contains the rotary solenoid and this is coupled to a screened aperture 57 as illustrated in FIG. 2A which is a cover plate 58 covering the front side of housing 39.

Aperture 57 is coupled to the ambient atmosphere through a hood 61 which is retained on carriage 13 and surrounds the entire housing 39. The hood is purged with dry nitrogen through channel 15 in the carriage to protect the apparatus from the ambient corrosive atmosphere. However, sufficient leaks are present to maintain the atmosphere within the hood at ambient pressure. Hood 61 includes diaphrams 62 and 63 which are similar in construction to diaphram 23 to communicate with the ambient atmosphere and provide for almost instantaneous equalization of pressure in the case where, for example, diaphram 23 would be suddenly compressed by movement of the sheet material. These diaphrams are necessary since with the low pressure, i.e., 0.1 psi, being utilized in the present invention, the air may be relatively incompressible.

The lower portion 17 of the gauge as shown in FIG. 1 has a substantially identical structure as heretofore described in connection with upper portion 16. The only substantial difference between the two portions is in the magnetic circuit apparatus to be described below.

In order to regulate the amount of pressure, the pressure cavity 42 also includes a force control means on the back of housing 39. This includes a rotatable disc 64 having different sized apertures 66 which may be selectively rotated into coincidence with aperture 67 in housing 39 to thus allow leakage of some of the air from pressure cavity 42 into the surrounding atmosphere in hood 61. This, therefore, provides a control on the maximum pressure which may build up in pressure cavity 42. Force on the sheet material may, therefore, be adjusted to accommodate fine paper which is easily torn. In addition unequal forces on the opposed diaphrams due to differences in fans or the structure of the diaphrams themselves may be equalized. Maximum pressure may also be controlled by varying the voltage supplied to the fan motors.

In accordance with the invention, magnetic circuit means are centrally mounted on first and second flexible diaphrams 23 and 23' as shown in FIG. 4 to provide a gap 18 in which sheet material or paper may be inserted. Diaphram 23' is part of the lower portion 17 of the gauge. This circuit includes a U-shaped core 71 of ferrite material having a first leg 72 and a second leg 73 along with bobbins or windings 74 and 75 respectively. A bearing shoe 76 with a flat planar surface 77 for engaging the sheet material is mounted on diaphram 23. Shoe 76 includes a first aperture 78 through which ferrite leg 72 extends and is fixed in the aperture by an essentially rigid adhesive such as an epoxy glue and a second aperture 79 through which leg 73 extends, the leg being fixed in the aperture by a rubber type adhesive such as room temperature vulcanizing (RTV) rubber. Core 71 can take many other forms also. However, the use of the U-shape is believed preferable to prevent warping of the bearing shoe. Shoe 76 consists of a highly wear resistant dimensionally stable material such as ruby or sapphire. Such material provides a flatness of better than 0.0001 inch even under extreme temperature variations.

Coupled to diaphram 23' is a bearing shoe 81 which consists of ferrite and which has a planar surface 82 for engagement with the sheet material. Thus, a complete flux path is created by the U-shaped ferrite core 71, the gap 18 and the ferrite shoe 81. Shoe 81 has a larger diameter than shoe 76 to compensate for any misalignment. The ferrite is a ceramic material which is also dimensionally stable although slightly less so than ruby. However, a single crystal ferrite would provide the same stability as ruby.

The magnetic circuit is driven by means of an oscillator illustrated in FIG. 5 supplied from a voltage supply V. The oscillator includes amplifier 83 along with a feedback circuit which includes the inductive windings 74, 75 and a capacitor C. This provides an oscillator where the resonant frequency at the terminal designated $f_R$ is determined by the inductance L of the winding 74, 75. This inductance in turn, is determined by the gap distance 18 which is the thickness of the sheet material. The output frequency of the oscillator of FIG. 5 is therefore a measure of the thickness of the sheet material. This can be shown by the following proof. The resonant frequency $f_R$ of the oscillator is $$f_R = 1/2\pi \sqrt{LC} \qquad (1)$$

The inductance L is determined by $$L = N\phi/I \qquad (2)$$

where $$\phi = \phi_1 + \phi_2 \qquad (3)$$

where $\phi_1$ is the main flux in the gap and $\phi_2$ the leakage flux which may be assumed constant. Therefore $$\phi_2 = K_2 \qquad (4)$$

and $$\phi_1 = 1/G + K_3 \qquad (5)$$

where G is the thickness of the gap or sheet material in mils and $K_3$ is a constant to correct for the magnetic reluctance of the ferrite. Substituting equations (2), (3), (4) and (5) in (1) yields $$f_R = \dfrac{1}{\sqrt{\dfrac{K_1}{G + K_3} + K_2}} \qquad (6)$$

where $K_1$ combines all constants. Solving for G $$G = \dfrac{K_1}{\dfrac{1}{f_R^2} - K_2} - K_3 \qquad (7)$$

Thus, the thickness of the sheet material G is proportional to the resonant frequency $f_R$ of the oscillator in the manner as shown above. In addition, a constant T is adjusted for each particular type of sheet material or paper being measured in order to simulate the required eight pounds per square inch of pressure under standard TAPPI measurement procedure. Thus, the present invention provides on-line readout of normalized TAPPI standard thickness measurements. The final equation used for computer purposes is $$G = \left[ \dfrac{K_1}{\left(\dfrac{K_4}{\text{Count}}\right)^2 - K_2} - K_3 + T \right] [A(Moi\text{-}MoiRef) + 1] \qquad (8)$$

where $K_4$/Count converts $f_R$ into a digital count taken over a set time interval, T is the TAPPI correction, Moi is the actual moisture and MoiRef the reference moisture in the sheet material (these values are obtained from a moisture gauge) and A is a constant for a given type of sheet material.

Still referring to FIG. 4 there are also mounted on diaphram 23 and 23' additional stainless steel bearing rings 84 and 84' for bearing against the sheet material. These provide for additional stability against tilting. Each of the friction rings includes an associated annular backing plate 86 and 86'. The rings being located in the same plane as the shoes cause the central portions of the diaphrams to act as zero deflection membranes thus maintaining constant the force of the bearing shoe on the paper regardless of paper location within the overall gap between ring 27 (FIG. 2) and the opposite ring on the lower gauge portion.

In order to drain off any electrostatic charge which may build up on the gauge, grounded plate 87 is provided opposite the ferrite shoe 82 and a plate 88 is used in conjunction with shoe 76. In addition, the ruby shoe 76, for example, may itself be metallized in order to prevent charge buildup. Another alternative is to use electrically conductive rubber for the material of the diaphrams.

The use of the diaphram structures with their convolutions or corrugations 24 and 24' provide for a type of pivotal mounting of the bearing shoes 76 and 81 where their pivot points are substantially in the same plane as their planar surfaces 77 and 82 which engage the sheet material to be measured. This is a characteristic of the flexible sheet material mounting provided for by the rubber diaphrams. Thus, it is superior to complicated rigid structural linkages which could not provide a pivot point of this type. Such a pivotal mounting is ideal for the shoes 76 and 81 since it allows them to be freely articulated by the paper material which is substantially in the same plane as the pivot points. This provides for meeting one of the main objectives of the invention which is to provide a measuring device with improved articulation for allowing the movement of sheet material.

Another object was to provide for temperature stability. This is achieved in part by the use of a temperature stable material such as ruby for the shoe 76 in which is mounted the ferrite core 71. In addition, to prevent placing any stresses on the shoe 76 by thermal conditions, the use of RTV type rubber in fixing the leg 73 in aperture 79 reduces such stresses.

FIGS. 6 and 7 show an alternative embodiment of the invention which is believed to provide improved bearing surfaces relative to moving paper 18. Referring to both of the figures, flexible diaphrams 90 and 90' are provided which are substantially similar to diaphrams 23 and 23'. They are mounted by retaining rings 26' and 27' in the case of the lower scanning head and rings 26 and 27 (not shown) in the case of the upper scanning heads. Each diaphram has affixed to its outer periphery metal rings 91 and 91' by which it is respectively fixed to rings 27 and 27'.

Upper diaphram 90 has mounted on its center portion a ruby bearing shoe 76 which contains the U-shaped ferrite core 71 and the lower diaphram 90' has mounted on its center portion ferrite bearing shoe 81 juxtaposed with the bearing shoe 76. These operate in the same manner as in the foregoing embodiment in providing measurement of thickness of paper 18 as it moves through the gap formed therebetween.

Corrugation 24 is near the circumference of the diaphrams 90 and 90'; that is, it is near the metal rings 91, 91'.

Located concentric with both the center of the diaphram and inboard of the corrugations 24, 24' are rings of rigid material, such as metal, 92 and 92' which define drumhead type portions 93, 93' of the diaphrams. In other words, movement of the drumhead portions 93, 93' is restrained by the respective rings 92, 92'. The bearing shoes 76 and 81 are, of course, respectively located at the center of the drumhead portions.

A plurality of bearing members of highly wear resistant dimensionally stable material are mounted on each of the drumhead portions between the rings 92, 92' and the centers of the portions for bearing against the moving sheet material along with the bearing shoes 76 and 81. As best shown in FIG. 7, these consist of five circular disks 94'a – 94'e which are mounted on the drumhead portion 93' on a circle concentric with the center of the portion. Drumhead portion 93 includes five similar bearing members which are juxtaposed with the members 94'a – 94'e. In the preferred embodiment, all of these bearing members consist of sapphire material.

In operation, these bearing members bear against moving sheet material 18 to provide for improved articulation of the bearing shoes 76 and 81 with movement of the sheet material and in addition to prevent nipping the sheet material and subsequent tearing by the measuring apparatus.

With the foregoing member construction in combination with the rubber diaphram mounted as illustrated in FIG. 6, the pivot points of both the bearing shoes 94a – e and 94'a – e and the bearing shoes 76 and 81 are substantially in the same plane, for example, as the surface 82 which engages the moving sheet material to be measured. The foregoing mounting of the measuring apparatus allows the apparatus to accommodate both the effects of tilting caused by angular shift in the plane of the paper sheet 18 or in thickness of the paper which causes the shoes 76 and 81 to rise or fall. In addition, the present invention accommodates movement of the passline which is an up and down movement of the paper.

I claim:

1. Apparatus for sensing the thickness of moving sheet material comprising: first and second air chambers having first and second major apertures respectively; first and second flexible sheet means each having at least one corrugation and closing said first and second apertures respectively said sheet means being juxtaposed to provide a gap therebetween in which said sheet material may be inserted; magnetic circuit means mounted on said first and second sheet means to provide a magnetic flux across said gap; air supply means for providing a pressure in said chambers greater than ambient pressure to tend to cause said first and second flexible sheet means to move toward one another and to cause said magnetic circuit means to move into mutual engagement with said moving sheet material whereby the length of the flux path across said gap is modified in accordance with the thickness of said sheet material and said flexible sheet means in cooperation with their corrugations accommodate tilting of said moving sheet material.

2. Apparatus as in claim 1 where said magnetic circuit includes a U-shaped core of magnetic material, winding means on the core, bearing shoe means fastened to said first sheet means having apertures through which the legs of the core extend, said shoe means consisting of a highly wear-resistant dimensionally stable material, said magnetic circuit also including a disc of magnetic material mounted on said second sheet means whereby a flux path is completed between said legs through said disc and said gap.

3. Apparatus as in claim 2 where one of said legs is fixed in said shoe aperture by a relatively rigid adhesive and the other of said legs is fixed in said shoe aperture by a rubber type adhesive.

4. Apparatus as in claim 2 where said shoe means consists of ruby material.

5. Apparatus as in claim 1 together with two bearing rings of relatively rigid material affixed respectively to said first and second sheet means for bearing against said sheet material said rings lying in substantially the same plane as the portions of said magnetic circuit means engaging said sheet material.

6. Apparatus as in claim 1 where each of said chambers has an additional aperture together with means for coupling said aperture to ambient atmosphere said coupling means including flexible sheet means each having at least one annular corrugation.

7. Apparatus as in claim 6 where said coupling means includes a hood surrounding each of said chambers each of said hoods including at least one flexible sheet means for communicating to said ambient atmosphere.

8. Apparatus as in claim 1 where said magnetic circuit means includes a first portion centrally mounted on said first sheet means for providing a source of magnetic flux and a second portion mounted on said second sheet means for completing a flux path from said first portion through said gap to said second portion.

9. Apparatus as in claim 8 where said second portion has a larger diameter than said first portion to compensate for misalignment.

10. Apparatus as in claim 1 together with oscillator means having a resonant frequency determined by a feedback circuit which includes a winding for driving said magnetic circuit means.

11. Apparatus for sensing the thickness of moving sheet material comprising: magnetic circuit means having a first portion for providing a source of magnetic flux and a second portion juxtaposed with said first portion to provide a gap therebetween in which said sheet material may be inserted for completing a flux path from said first portion through said gap to said second portion;, said first portion including a member of magnetic material and a bearing shoe having a planar surface for engaging said moving sheet material, the end of said member extending through said shoe, said second portion also including a bearing shoe having a planar surface for engaging the opposite side of said material and means for pivotally mounting said bearing shoes respectively with pivot points which are substantially in the planes of said respective planar surfaces such pivotal mounting means accommodating tilting of said moving sheet material and including first and second flexible sheet means each having at least one corrugation.

12. Apparatus for measuring a predetermined characteristic of moving sheet material comprising: first and second air chambers having first and second major apertures; first and second flexible sheet means each having at least one corrugation and closing said first and second apertures respectively said sheet means being juxtaposed to provide a gap therebetween in which said sheet material may be inserted; measuring means mounted on said first and second sheet means for measuring a predetermined characteristic of said sheet material; air supply means for providing a pressure in said chambers greater than ambient pressure to cause said first and second sheet means to move toward one another and to cause said measuring means to move into mutual engagement with said sheet material said flexible sheet means in cooperation with their corrugations accommodating tilting of said moving sheet material.

13. Apparatus as in claim 11 where said bearing shoes consist of dimensionally stable material.

14. Apparatus as in claim 12 where each of said flexible sheet means is circular in configuration and include a circular corrugation near the circumference of the sheet means together with a ring of rigid material located inboard of said corrugation and defining a drumhead type portion for each of said sheet means the center of said drumhead portions of each of said sheet means having said measuring means mounted thereon and together with a plurality of bearing members of highly wear resistant material mounted on each of said drumhead portions between said ring and said center for bearing against said sheet material.

15. Apparatus as in claim 14 where each of said plurality of said bearing members are located on a circle concentric with said center of said drumhead portions.

16. Apparatus as in claim 14 where said bearing members consist of sapphire material.

17. Apparatus for sensing the thickness of moving sheet material comprising: an air chamber having a major aperture, first flexible sheet means having at least one corrugation and closing said major aperture; second sheet means juxtaposed with said first sheet means to provide a gap therebetween in which said sheet material may be inserted; magnetic circuit means mounted on said first and second sheet means to provide a magnetic flux across said gap; air supply means for providng a pressure in said chamber greater than ambient pressure to tend to cause said first flexible sheet means to move toward said second sheet means and to cause said magnetic circuit means to move into mutual engagement with said moving sheet material whereby the length of the flux path across said gap is modified in accordance with the thickness of said sheet material and said flexible sheet means in cooperation with said corrugation accommodates tilting of said moving sheet material.

18. Apparatus as in claim 12 where each of said flexible sheet means is circular in configuration and include a circular corrugation near the circumference of the sheet means together with a ring of rigid material located inboard of said corrugation and defining a drumhead type portion for each of said sheet means the center of said drumhead portions of each of said sheet means having said measuring means mounted thereon.

* * * * *